(12) United States Patent
Bergerson et al.

(10) Patent No.: US 10,937,087 B2
(45) Date of Patent: Mar. 2, 2021

(54) SYSTEMS AND METHODS FOR OPTIMAL BIDDING IN A BUSINESS TO BUSINESS ENVIRONMENT

(71) Applicant: Vendavo, Inc., Denver, CO (US)

(72) Inventors: Eric Bergerson, Forest Hills, NY (US); Megan Kurka, Forest Hills, NY (US); Huashuai Qu, Sunnyvale, CA (US); Ilya O. Ryzhov, College Park, MD (US); Michael C. Fu, College Park, MD (US)

(73) Assignee: VENDAVO, INC., Denver, CO (US)

( * ) Notice: Subject to any disclaimer, the term of this patent is extended or adjusted under 35 U.S.C. 154(b) by 0 days.

(21) Appl. No.: 16/571,938

(22) Filed: Sep. 16, 2019

(65) Prior Publication Data

US 2020/0013114 A1    Jan. 9, 2020

Related U.S. Application Data

(63) Continuation of application No. 15/255,115, filed on Sep. 1, 2016, now Pat. No. 10,417,699.

(60) Provisional application No. 62/214,193, filed on Sep. 3, 2015.

(51) Int. Cl.
*G06Q 30/00* (2012.01)
*G06Q 30/08* (2012.01)
*G06Q 30/02* (2012.01)

(52) U.S. Cl.
CPC ........ *G06Q 30/08* (2013.01); *G06Q 30/0283* (2013.01)

(58) Field of Classification Search
None
See application file for complete search history.

(56) References Cited

U.S. PATENT DOCUMENTS

| 8,396,814 B1 * | 3/2013 | Sundaram | G06Q 30/02 705/400 |
| 2004/0215550 A1 | 10/2004 | Preist et al. | |
| 2009/0144101 A1 * | 6/2009 | Malov | G06Q 30/0201 705/7.29 |

* cited by examiner

*Primary Examiner* — Mila Airapetian
(74) *Attorney, Agent, or Firm* — Jeffri A. Kaminski; Venable LLP

(57) ABSTRACT

The present invention relates to systems and methods for optimizing bidding in a business-to-business environment. Initially the observed outcomes for n deals are received, and the belief parameters for these n deals are calculated. The Bayes-greedy price is then calculated and presented to a buyer. The buyer's response is collected and an optimal variance parameter based on the buyer's response is generated. The belief parameters for these n+1 deals are also updated. This process may be repeated for additional deals.

20 Claims, 2 Drawing Sheets

SYSTEMS AND METHODS FOR OPTIMAL BIDDING IN A BUSINESS TO BUSINESS ENVIRONMENT

CROSS REFERENCE TO RELATED APPLICATIONS

This application is a continuation of U.S. patent application Ser. No. 15/255,115, filed Sep. 1, 2016, which claims the benefit of priority of U.S. Provisional Patent Application No. 62/214,193, filed Sep. 3, 2015, the entire contents of which are hereby incorporated by reference.

BACKGROUND

The present invention relates to systems and methods for optimally pricing high-volume commercial transactions between businesses, referred to as business-to-business (B2B) pricing.

For example, consider a negotiation between a supplier of raw materials (the seller) and a manufacturer (the buyer). Abstracting away the details of the negotiation, it may be reduced to a final price offer named by the seller. If the price is rejected, the seller incurs a high opportunity cost (lost revenue); however, it may not be clear whether a lower offer would have gotten the deal, and if so, how much lower it should have been. If the price is accepted, the seller is left wondering whether a higher price would have also worked. The seller makes many such pricing decisions over time, and attempts to maximize revenue, subject to considerable uncertainty about buyer behavior and willingness to pay.

Looking at historical pricing information, common trends are identified in these B2B pricing scenarios. These challenges include:

Big data. The data is highly heterogeneous, covering thousands of distinct products and buyers. Different product types have different price sensitivities. Consequently, the data contain a large number of "rows" (observed deals) as well as "columns" (explanatory variables). Predictive models may thus be vulnerable noise accumulation, spurious correlations, and computational issues.

Noise. Often the data is restricted to a binary (yes/no) response from the buyer, representing whether the seller's price was accepted or rejected. The proportion of accepted offers ("wins") is very low. Furthermore, many of the products and buyers may appear infrequently and have few or no wins. Even with a large amount of data, predictive models are likely to be inaccurate.

High cost of failure. If a price is rejected, the seller's revenue is zero. In B2B transactions, the total value of the deal may be in the millions of dollars. If the historical data are insufficient to make accurate predictions about future deals, the seller must learn quickly from new deals as they take place. It is thus not enough to use a pricing strategy that works well "over the long run," as the practical value is in the very short term.

It is therefore apparent that an urgent need exists for systems and methods for using predictive and prescriptive analytics (statistical modeling and price optimization) in B2B pricing.

In addition to short-term performance, computational efficiency is also an issue. Ideally, price optimization should be implementable in real time and on demand, so that a sales representative may access it during a negotiation through a tablet app.

SUMMARY

To achieve the foregoing and in accordance with the present invention, systems and methods for optimizing bidding in a business-to-business environment are provided. Initially the observed outcomes for n deals are received, and the belief parameters for these n deals are calculated. The Bayes-greedy price is then calculated and presented to a buyer. The buyer's response is collected and an optimal variance parameter based on the buyer's response is generated. The belief parameters for these n+1 deals are also updated. This process may be repeated for additional deals.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
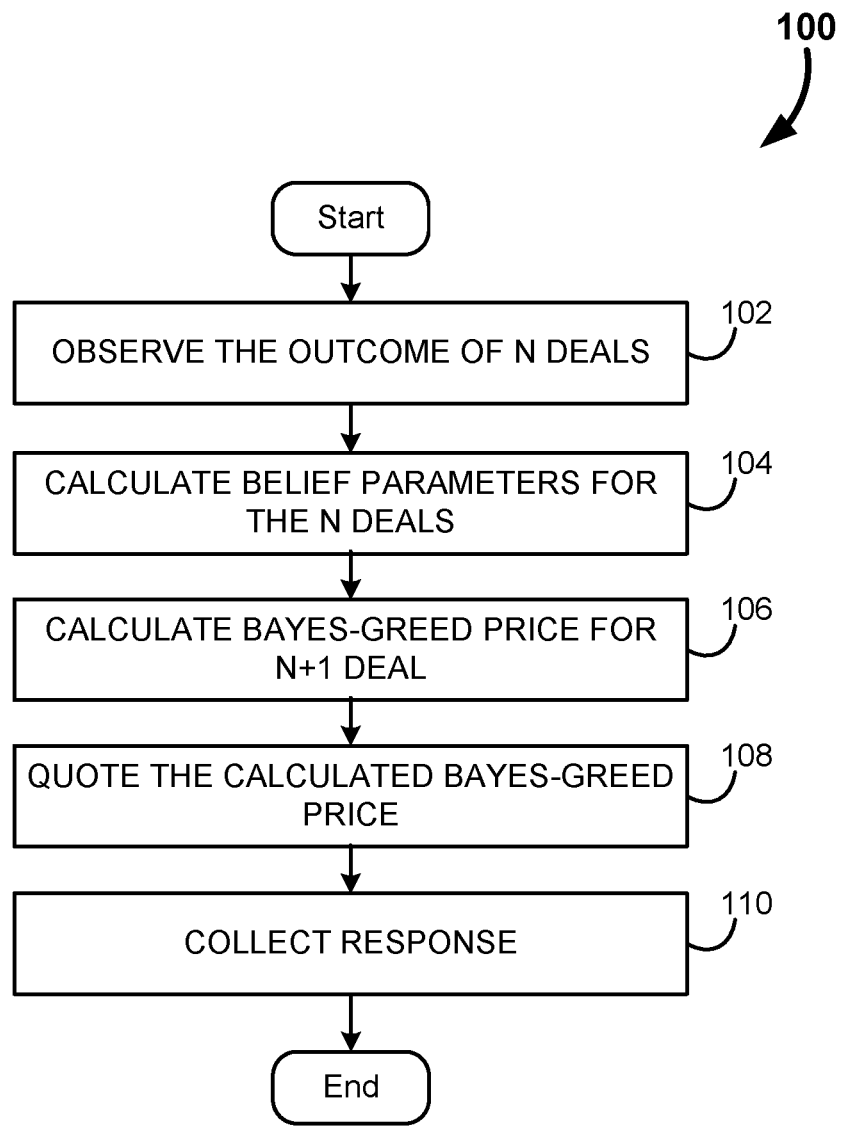
FIG. 1 is a flow diagram of an example process for generating and administering a quote using Bayes-Greedy projections, in accordance with some embodiment.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description. It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "only," "first," "initially," "next," "subsequently," "before," "after," "lastly," and "finally," are not meant to limit the scope of the present invention as the embodiments disclosed herein are merely exemplary.

The presently disclosed systems and methods are directed toward using predictive and prescriptive analytics in B2B pricing. Many models in revenue management allow stochastic product demand but in B2B environments case, the seller faces the additional challenge of environmental uncertainty: the seller does not know the exact distribution of the buyer's willingness to pay. Rather, this distribution is estimated from historical data, assuming some statistical model (e.g., logistic regression), and this model is updated over time as new transactions take place. In this way, any given deal provides new information about the demand distribution, aside from its purely economic value in generating revenue. Furthermore, since any given statistical model is likely to be inaccurate, the seller may not wish to implement the price that seems to be optimal under that model. Instead, the seller may experiment with prices (for instance, charging slightly more or less than the recommended price) in order to obtain new information and potentially discover better pricing strategies. Doing this may result in lost revenue at first, but the new information may help to improve pricing decisions in the (hopefully near) future.

This problem may be approached from the perspective of optimal learning, which typically uses Bayesian models to measure the uncertainty, or the potential for error, in the predictive model. In some embodiments, logistic regression with the coefficients modeled as a random vector (because their "true" values are unknown). The power of these models comes from the concept of "correlated beliefs", which measures the similarities and differences between various types of deals, so that a sale involving one product will teach something about other, similar products. The Bayesian model can then be integrated with a pricing strategy that accounts for the uncertainty in the model, e.g., by correcting overly aggressive prices when the uncertainty is high, or by experimenting with higher prices when there is a chance that they may be better than we think. The outcomes of the decisions feed back into the model and modify beliefs for future decisions. This framework can provide meaningful guidance within very short time horizons, even in the presence of very noisy data.

Optimal learning methods typically use simple Bayesian models that can be updated very quickly. In linear regression (such as least squares), the standard approach is to assume that the regression coefficients are normally distributed, which enables concise modeling and updating correlated beliefs. However, there is no analogous model for logistic regression, making it difficult to represent beliefs about logistic demand curves. This problem can be approached using approximate Bayesian inference, and create a new learning mechanism that allows the seller to maintain an update a multivariate normal belief on the regression coefficients using rigorous statistical approximations. The seller may then develop a "Bayes-greedy" pricing strategy that optimizes an estimate of expected revenue by averaging over all possible revenue curves.

The Bayesian framework performs very well in both predictive and prescriptive roles. Surprisingly, despite the approximations used in the Bayesian model, it demonstrates superior predictive power over exact logistic regression. It has been determined that uncertainty is valuable: the benefits of quantifying uncertainty about the predictive model vastly outweigh any reduction in accuracy incurred by using approximations. Not only does the Bayesian model make more accurate predictions of future wins and losses, but the Bayes-greedy policy generates more revenue by integrating the uncertainty directly into the pricing decision.

Thus, this disclosure makes the following contributions: 1) the introduction of a new approximate Bayesian learning model for learning B2B demand curves based on logistic regression. The presently disclosed approach optimizes a statistical measure of distance between the multivariate normal approximation and the exact, non-normal posterior distribution. This optimality criterion has great practical significance, as improved performance from the Bayesian model is not seen when it is not used. 2) The seller's beliefs can be efficiently updated in this model, using stochastic gradient methods to calculate the optimal statistical approximation. 3) The Bayes-greedy pricing policy is presented, and shows how these prices can be efficiently computed.

Lastly, note that the following disclosure includes a series of subsections. These subsections are not intended to limit the scope of the disclosure in any way, and are merely for the sake of clarity and ease of reading. As such, disclosure in one section may be equally applied to processes or descriptions of another section if and where applicable.

I. Modeling Demand Curve

To facilitate this discussion, consider a generic deal in which the seller quotes a pricer, and the buyer makes a binary response denoted by Y. The event that Y=1 represents a sale (or "win"), whereas Y=0 is a "loss," meaning that the deal did not go through. The win probability may be expressed P(Y=1) as a function:

$$\rho(x, \beta) = \frac{1}{1 + e^{-\beta^T x}} \qquad \text{Equation 1}$$

where $x \in R^M$ is a vector that depends on p, as well as on additional characteristics of the product or the buyer, which are known to the seller at the time p is chosen. The function $\rho$, which is not known exactly to the seller, is also called the demand curve. The seller's expected revenue from the deal is given by:

$$R(p;x,\beta) = p \cdot \rho(x,\beta), \quad p \geq 0,$$

with $p^* = \arg\max_p R(p; x, \beta)$ denoting the optimal price. For simplicity, the revenue function is used throughout this paper. However, it is straightforward to modify the analysis to maximize profit rather than revenue.

Equation 1 is an instance of logistic regression, a standard model for forecasting demand or sales. In the simplest possible case, we can let $x = [1, p]^T$, which implies that the buyers are homogeneous (given a fixed price, their valuations are drawn from a single common distribution). However, in practice, x also contains information such as the type and quantity of product stipulated in the deal. A large number of dummy variables may be used to describe the product. For example, a large retailer may wish to include features that classify products by department (e.g., electronic, furniture, housewares, etc.), then generally describe the item in question (e.g., TVs, cameras, tablets), and finally give more detailed information such as the brand and model of the item. Additionally, x could describe the buyer with varying degrees of granularity (e.g., whether the buyer is located in Europe or Asia for example, followed by more detailed country information), since B2B pricing is highly individualized. It is also possible to include interaction terms between product and customer features (e.g., if a particular product type sells better in a particular region), as well as interactions between these features and the price (to model the case where different products have different price sensitivities). Since the outcome of B2B negotiations heavily depends on the individual salesperson, x may also include characteristics of the sales force. In a practical application, x may include hundreds or thousands of elements.

However, in all of these cases, the regression coefficients β are unknown to the seller, and must be inferred based on prior knowledge as well as new information obtained by observing new wins and losses. The margin for error in estimating β is quite narrow. First, the opportunity cost for lost deals is extremely high (we receive zero revenue if the deal fails). Second, the demand curve can be highly sensitive to the values of β, meaning that small estimation errors can lead to large differences in the recommended prices. A Bayesian framework is now described for optimal learning on the basis of a single new observation (the goal being to implement this framework sequentially).

II. Bayesian Model for Learning Demand Curves

In the Bayesian view, any unknown quantity is modeled as a random variable whose distribution represents our beliefs about likely values for that quantity. A multivariate normal prior distribution is used, that is:

$$\beta \sim N(\theta, \Sigma) \quad \text{Equation 2}$$

The main benefit of the multivariate normal distribution is that it allows us to compactly; represent correlated beliefs using the covariance matrix $\Sigma$. The off-diagonal entries in this matrix can be viewed as representing the degree of similarity or difference between the values of different regression coefficients. Correlations have great practical impact when the design matrix is sparse, that is, many of the components of x are equal to zero for any given observation. This is likely to be the case in our application: the seller may include thousands of distinct products into the model, and only a few observations may be available for a given product even if the overall dataset is large. However, if we believe that two products are similar, correlated beliefs will allow us to learn about one product from a deal that involves the other one. This greatly increases the information value of a single deal, and allows us to learn about a large number of products from a small number of observations. Furthermore, normality assumptions will substantially simplify the computation of optimal prices.

However, we first require a mechanism for efficiently updating the covariance matrix after new observations. We use Bayes' rule to derive the conditional density of β given Y, the associated features x, and the modeling assumption in equation 2. This posterior density represents our new beliefs about the regression coefficients after an additional observation has been made. We first rewrite the likelihood function of Y more compactly as $l(H(\beta; Y))$, where $$\ell(z) = \frac{1}{1+e^{-z}} \text{ and } H(\beta; Y) = (2Y-1)\beta^T x.$$

Then, the posterior density of β can be written as:

$$P(\beta|x, Y) \propto \ell(H(\beta; Y))|\Sigma|^{-\frac{1}{2}} e^{-\frac{1}{2}(\beta-\theta)^T \Sigma^{-1}(\beta-\theta)}. \quad \text{Equation 3}$$

In multi-stage problems where decisions are made sequentially, it is desirable to use a conjugate model where the prior and posterior distributions belong to the same family (e.g., multivariate normal). Such models admit computationally efficient learning schemes where the entire belief distribution is compactly characterized by a finite number of parameters, and these parameters can be updated recursively after each new observation. However, equation 3 is non-normal due to the presence of l.

We would like to retain the multivariate normal distribution in order to use the power of correlated beliefs. Since this is not possible using standard Bayesian updating, we use the methods of approximate Bayesian inference. Essentially, if the posterior distribution is not conjugate with the prior, we replace it by a simpler distribution that does belong to our chosen family (multivariate normal), and optimally approximates the true, non-normal posterior. We use a variational Bayesian approach, where the parameters (θ', Σ') of the desired normal density Q are chosen to minimize the Kullback-Leibler (KL) divergence between Q and the true posterior $P(\cdot|x, Y)$. This quantity is defined as:

$$\mathcal{D}^{KL}(Q \| P) = \mathbb{E}_Q\left(\log \frac{Q(\beta; \theta', \Sigma')}{P(\beta; x, Y, \theta, \Sigma)}\right), \quad \text{Equation 4}$$

where $\mathbb{E}_Q$ is the expectation with respect to Q. The KL divergence, which is always non-negative, measures the "distance" between two probability distributions. Lower KL divergence suggests that there is more similarity between P and Q (zero KL divergence occurs if and only if P and Q are identical). We wish to find:

$$(\theta^*, \Sigma^*) = \arg\min_{(\theta' \Sigma')} \mathcal{D}^{KL}(Q \| P).$$

the parameter values for which the multivariate normal distribution Q optimally approximates the non-normal distribution P.

III. Approximate Bayesian Inference

We first observe that the definition in equation 4 can be partially simplified, due to the following result. Proposition 1. Given x, and the modeling assumption in equation 2, the KL divergence can be written as:

$$\mathcal{D}^{KL}(Q\|P) = \mathbb{E}_Q[\log(1+e^{-H(\beta;Y)})] + h(\theta,\Sigma,\theta',\Sigma'), \quad \text{Equation 5}$$

with the second component given in closed form as:

$$h(\theta, \Sigma, \theta'\Sigma') = \quad \text{Equation 6}$$

$$\frac{1}{2}\left[tr\left(\sum^{-1}\Sigma'\right) + (\theta-\theta')^T \sum^{-1}(\theta-\theta') - M - \log\frac{|\Sigma'|}{|\Sigma|} + C\right].$$

where C is a constant that does not depend on θ', Σ'. Proof: From equation 3: we have:

$$\log\frac{Q(\beta; \theta', \Sigma')}{P(\beta; x, Y, \theta, \Sigma)} = \log\frac{|\Sigma'|^{-\frac{1}{2}} e^{-\frac{1}{2}(\beta-\theta')^T \Sigma^{-1}(\beta-\theta')}}{\ell(H(\beta; Y))|\Sigma'|^{-\frac{1}{2}} e^{-\frac{1}{2}(\beta-\theta)^T \Sigma^{-1}(\beta-\theta)}} + C.$$

Taking expectations yields:

$$\mathcal{D}^{KL}(Q\|P) = \mathbb{E}_Q[\log(1+e^{-H(\beta;Y)})] + \mathcal{D}^{KL}(Q\|P_o),$$

where $P_0$ is the prior distribution $N(\theta, \Sigma)$. The KL divergence between two multivariate normal distributions is given in equation 6.

Unfortunately, even with this simplification, the expectation in equation 5 cannot be expressed in closed form. Note, however, that the function inside the expectation is known, and the expectation is taken with respect to a known distribution. To optimize the expected value, we can use gradient-based stochastic search. In gradient-based optimization, we would first calculate:

$$\nabla \mathcal{D}^{KL}(Q\|P) = \nabla \mathbb{E}_Q[\log(1+e^{-H(\beta;Y)})] + \nabla h(\theta, \Sigma, \theta'\Sigma'), \quad \text{Equation 7}$$

where $\nabla$ is the gradient with respect to $(\theta, \Sigma)$, and apply a steepest descent algorithm to find $(\theta', \Sigma^*)$ to a desired precision. Since the expectation in equation 7 is intractable, its gradient also cannot be written explicitly, but it can be estimated from Monte Carlo simulation. The likelihood ratio method may be utilized for estimating the gradient of the KL divergence in Bayesian logistic regression. However, this and other gradient-based methods often converge slowly to the optimal solution when the dimensionality of the problem is high. In our case, we are estimating $M^2+M$ parameters, where M is on the order of hundreds or thousands.

To mitigate these computational challenges, we propose the following form for $(\theta, \Sigma)$:

$$\theta' = \Sigma'(\Sigma^{-1}\theta + (Y-1/2)x) \quad \text{Equation 8}$$

$$\Sigma' = (\Sigma^{-1} + v^{-1}xx^T)^{-1} \quad \text{Equation 9}$$

We apply the Sherman-Morrison-Woodbury formula to equations 8-9 and obtain:

$$\theta' = \theta + \frac{v\left(Y - \frac{1}{2}\right) - x^T\theta}{v + x^T\Sigma x}\Sigma x, \quad \text{Equation 10}$$

$$\Sigma' = \Sigma - \frac{\Sigma xx^T\Sigma}{v + x^T\Sigma x}. \quad \text{Equation 11}$$

This form substantially reduces the dimensionality of the optimization problem, as there is now only a single parameter v to be determined. Aside from this computational convenience, we choose this precise form for the posterior parameters because it resembles the updating equations used in Bayesian linear regression. In a standard least-squares model $y = x^T\beta + \varepsilon$, normality assumptions on $\beta$ and the residual error $\varepsilon$ induce normality of the posterior distribution of $\beta$ given y and x. Furthermore, the parameters of the posterior distribution can be computed recursively from the prior parameters using an update that is very similar to equations 10-11. In our case, the quantity v in equation 11 is exactly analogous to the variance of the residual error in linear regression, while the quantity $v(Y-1/2)$ replaces the continuous observation y.

Intuitively, this model treats $v(Y-1/2)$ as an observation of the log-odds of success for the next deal. Subtracting ½ from Y ensures that this observation can be both positive and negative, so that new wins cause us to increase the estimated win probability, while new losses shift the estimate downward. This is in line with the standard interpretation of logistic regression that positive coefficients lead to higher win probabilities. The parameter v can be thought of as a user-specified measure of the accuracy of this observation (higher v means lower accuracy).

It is fairly common to approach Bayesian logistic regression by forcing it to resemble linear regression. The main issue is the choice of v, since there is no pre-specified variance parameter in logistic regression. In some embodiments, the following may be used: $v = \hat{p}(1-\hat{p})$ where $\hat{p}$ is the predicted success probability for the feature vector x using $\theta$ as the regression coefficients.

We propose to calculate v by optimizing the KL divergence as follows:

$$\theta^* = \arg\min_v \mathcal{D}^{KL}(Q\|P)$$

IV. Gradient-Based Optimization of the KL Divergence

We estimate the gradient of the KL divergence using infinitesimal perturbation analysis. If Q is the distribution of $\beta$, we can write:

$$\log(1 + e^{-H(\beta;Y)}) = \log\left(1 + e^{-(2Y-1)\left(x^T\theta' + \sqrt{x^T\Sigma'x}\,Z\right)}\right),$$

where $Y \in \{0, 1\}$ is fixed and $Z \sim N(0, 1)$. For a fixed sample path $\omega$, we now write:

$$\nabla_v \log(1 + e^{-H(\beta(\omega);Y)}) = \quad \text{Equation 12}$$
$$-\frac{(2Y-1)e^{-H(\beta(\omega);Y)}}{1 + e^{-H(\beta(\omega);Y)}}\nabla_v\left(x^T\theta' + \sqrt{x^T\Sigma'xZ(\omega)}\right),$$

where $$\nabla_v\left(x^T\theta' + \sqrt{x^T\Sigma'x}\,Z(\omega)\right) = \quad \text{Equation 13}$$
$$\frac{\left(Y - \frac{1}{2}\right)x^T\Sigma x + x^T\theta}{(v + x^T\Sigma x)^2}x^T\Sigma x + \frac{(x^T\Sigma x)^2}{(v + x^T\Sigma x)^2}Z(\omega),$$

The next result shows that the sample path (IPA) derivative is an unbiased estimator for equation 5.

Proposition 2 is provided as:

$$|\nabla_v \log(1 + e^{-H(\beta(\omega);Y)})| \le \frac{x^T\Sigma x + x^T\theta}{|x^T\Sigma x|} + |Z(\omega)|,$$

We can directly verify the conditions given in Proposition 1 for the interchange between the gradient and the expectation. First, for any $\omega$, the gradient in equations 12-13 is continuous at all $v \ge 0$. Second, for any $\omega$, the above gradient exists for all $v \ge 0$. Third, for any fixed $v \ge 0$, the above gradient exists for all $\omega$. Finally, we observe that, for any v, $$|\nabla_v \log(1 + e^{-H(\beta(\omega);Y)})| \le \frac{x^T\Sigma x + x^T\theta}{|x^T\Sigma x|} + |Z(\omega)|$$

whence $E_Q \sup_v \nabla_v \log (1+e^{-H(\beta;Y)}) < \infty$. It is therefore valid to interchange the gradient and the expectation.

The IPA estimator for fixed v can be constructed as follows. Given fixed $\theta, \Sigma, x,$ and Y, we calculate $\theta$ and $\Sigma$ using equations 10 and 11. Then, we simulate $\hat{Z} \sim N(0, 1)$ and calculate $\hat{\beta} = x^T\theta' + \sqrt{x^T\Sigma'x}\cdot\hat{Z}$. The stochastic component of the estimator of $\nabla_v \mathcal{D}^{KL}(Q\|P)$ is given by:

$$\hat{G} = -\frac{(2Y-1)e^{-H(\hat{\beta};Y)}}{1 + e^{-H(\hat{\beta};Y)}}\left[\frac{\left(Y - \frac{1}{2}\right)x^T\Sigma x + x^T\theta}{(v + x^T\Sigma x)^2}x^T\Sigma x + \frac{(x^T\Sigma x)^2}{(v + x^T\Sigma x)^2}\hat{Z}\right].$$

To obtain the deterministic component, we return to equation 5 and differentiate h. The terms in equation 6 can be rewritten as:

$$tr\left(\sum{}^{-1}\Sigma'\right) = tr\left(I - \frac{xx^T\Sigma}{v+x^T\Sigma x}\right),$$

$$(\theta-\theta')^T\sum{}^{-1}(\theta-\theta') = \left(\frac{v\left(Y-\frac{1}{2}\right)-x^T\theta}{v+x^T\Sigma x}\right)^2 x^T\Sigma x,$$

$$\log|\Sigma'| = \log\left|\left(\sum{}^{-1}+v^{-1}xx^T\right)^{-1}\right|,$$

where $$\nabla_v tr\left(\sum{}^{-1}\Sigma'\right) = \frac{tr(xx^T\Sigma)}{(v+x^T\Sigma x)^2},$$

$$\nabla_v(\theta-\theta')^T\sum{}^{-1}(\theta-\theta') =$$

$$2\left(\frac{v\left(Y-\frac{1}{2}\right)-x^T\theta}{v+x^T\Sigma x}\right)\left(\frac{\left(Y-\frac{1}{2}\right)x^T\Sigma x+x^T\theta}{(v+x^T\Sigma x)^2}\right)(x^T\Sigma x)^2$$

and $$\nabla_v\log|\Sigma'| = -tr\left(\left(\nabla_v\left(\sum{}^{-1}+v^{-1}xx^T\right)\right)\Sigma'\right)$$

$$= \frac{1}{v^2}tr\left(xx^T\left(\Sigma - \frac{\Sigma xx^T\Sigma}{v+x^T\Sigma x}\right)\right)$$

$$= \frac{1}{v}\frac{1}{v+x^T\Sigma x}tr(xx^T\Sigma).$$

The final form for the IPA estimator is given by:

$$\nabla_v \mathcal{D}^{KL}(Q\|P) =$$

$$\left(\frac{v\left(Y-\frac{1}{2}\right)-x^T\theta}{v+x^T\Sigma x}\right)\left(\frac{\left(Y-\frac{1}{2}\right)x^T\Sigma x+x^T\theta}{(v+x^T\Sigma x)^2}\right)(x^T\Sigma x)^2 - \frac{x^T\Sigma x}{2v}\frac{tr(xx^T\Sigma)}{(v+x^T\Sigma x)^2} + \hat{G},$$

And it follows Proposition 2 that:

$$\nabla_v \mathcal{D}^{KL}(Q\|P) = \mathbb{E}(\hat{\nabla}_v \mathcal{D}^{KL}(Q\|P)).$$

We can now apply the Robbins-Monro stochastic approximation algorithm:

$$v^{k+1} = v^k - \alpha_k \hat{\nabla}_{v^k} \mathcal{D}^{KL}(Q\|P), \qquad \text{Equation 14}$$

which is guaranteed to converge to $v^*$ from an arbitrary starting point under suitable conditions on the step size $\alpha_k$. The value obtained from this algorithm can then be plugged into equations 10 and 11 to determine the parameters of the approximate posterior distribution.

V. Price Optimization in the Multi-Stage Problem

We now apply our approximate Bayesian framework to the multi-stage pricing problem. Turning to FIG. 1, a flow chart is provided, at 100, that details the steps taken to optimize the bidding process. Suppose that we have a sequence of deals, where $x^n$, $n=0, 1, \ldots, N$, denotes the features of the $(n+1)$st deal (including the quoted price $p^n$), and $Y^{n+1}$ is the buyer's response. We use different time indices to express the fact that the response is observed only after the features (and the price) have been fixed. The seller's initial beliefs are represented by a multivariate normal distribution with the prior parameters $(\theta^0, \Sigma^0)$, which may be calibrated based on historical data.

Suppose now that, after the first n deals have been observed (at 102), the seller's beliefs are represented (at 104) by a multivariate normal distribution with posterior parameters $(\theta^n, \Sigma^n)$. The features $x^n$ of the next deal become known to the seller, a price $p^n$ is quoted, and the response $Y^{n+1}$ is observed. We now apply approximate Bayesian inference and assume that the new posterior distribution of $\beta$, taking into account the new information $Y^{n+1}$, is normal. The parameters of this distribution are obtained from the recursive update equations 10-11, with the variance parameter v computed using the procedure presented previously. We then proceed to the next deal under the assumption that the seller's belief distribution continues to be normal.

The Bayes-Greed price for the n+1 deal is calculated (at 106) as is detailed below in relation to the next two sections. The quote is then administered to a buyer (at 108) and the buyer's response is collected (at 110). In this way, approximate Bayesian inference is applied sequentially. Every new iteration introduces an additional degree of approximation, but the learning mechanism is computationally efficient, and we maintain the ability to model and update our uncertainty about $\beta$. We now show how price optimization can be integrated into this framework.

VI. Definition of Bayes-Greedy Prices

The seller's pricing decisions are adaptive, so that may depend on the posterior parameters $(\theta^n, \Sigma^n)$, as well as on the other features of $x^n$. The seller's decision is to choose a pricing policy, which can be represented as a function $\pi$ mapping $(\theta^n, \Sigma^n, x^n)$ to a price $p^n \geq 0$. The optimal policy maximizes the objective function:

$$\sup_\pi \mathbb{E}_P \sum_{n=0}^N R(p^n; x^n, \beta)$$

where we take an additional expectation of the expected revenue since $\beta$ is random and the price $p^n$ is not known until n deals have been observed. The notation $\mathbb{E}_{\bar{P}}$ means that the expected value is taken with respect to the probability measure induced by the approximate Bayesian model.

It is clear that equation 15 is intractable even for small N, since our distribution of belief is characterized by $M^2 + M$ continuous parameters, and we have very little information about the process that generates the features $x^n$ of each deal. Modeling this process is substantially more difficult than modeling uncertainty about the regression coefficients, and is outside the scope of this paper. However, since the regression features are known when we choose the price for the deal, it is possible to design a myopic policy that seeks to maximize the revenue obtained from this deal without looking ahead to future deals. Myopic policies have been shown to possess asymptotic optimality properties in some cases. Since we primarily deal with short time horizons in our application, we focus on developing a myopic policy that is computationally tractable and will perform well in practice.

Recall that, ideally, the seller would like to maximize the true revenue curve by choosing the price $$p^{*,n} = \arg\max_{p \geq 0} \frac{p}{1+e^{-(x^n)^T\beta}},$$

where $x^n$ is a deterministic function of p. Since β is unknown, a standard definition for a myopic policy is given by $$p^n = \arg \max_{p \geq 0} \frac{p}{1+e^{-(x^n)^T \theta^n}}, \quad \text{Equation 16}$$

where $\theta^n$ is the current vector of regression coefficients. This approach is used in frequentist models, where $\theta^n$ is computed using maximum likelihood estimation (in other words, frequentist logistic regression). If $x^n$ depends linearly on the price, equation 16 has a closed-form expression in terms of the Lambert W function.

However, we argue that this approach will under-perform in the Bayesian setting, because it does not use all of the available information. The value of the Bayesian model is that it enables us to quantify the decision-maker's uncertainty about the regression coefficients. We can define the Bayes-greedy price:

$$p^n = \arg \max_{p \geq 0} \mathbb{E}_\beta^n \left( \frac{p}{1+e^{-(x^n)^T \beta}} \right), \quad \text{Equation 17}$$

where the expectation is taken with respect to the distribution $\beta \sim N(\theta^n, \Sigma^n)$ obtained through approximate Bayesian inference. Because the revenue function R is nonlinear, equations 16 and 17 yield different prices even for the same values of $x^n$ and $\theta^n$. The Bayes-greedy price takes uncertainty into account by integrating over the entire space of possible revenue curves. The next result shows that the Bayesian estimate of the revenue is quasi-concave, which implies that it has a single global maximum at the Bayes-greedy price.

IV. Computation of Bayes-Greedy Prices

We now discuss the solution of the Bayes-greedy price optimization problem in equation 17. Since this procedure only depends on n through the posterior parameters, we drop the time index in the following for notational convenience. Under the Bayesian assumption $\beta \sim N(\theta, \Sigma)$, we have $$x^T \beta \sim N(x^T \theta, x^T \Sigma x)$$

Consequently, the revenue function can be rewritten as $$R(p; x, \beta) = \frac{p}{1+e^{-x^T \theta - \sqrt{x^T \Sigma x} \cdot Z}}$$

where $Z \sim N(0, 1)$. The normality assumption considerably simplifies the computation of the Bayes-greedy price, since equation 17 now requires us to optimize an expectation over a scalar probability distribution. This expectation is known in statistics as the logistic-normal integral, and cannot be expressed in closed form. However, we observe that IPA can again be used to optimize it. Since the win probability ρ(x, β) is continuous, differentiable, and bounded in p, it is straightforward to show (similarly to Proposition 2) that the relevant conditions for the validity of the IPA estimator hold, whence $$\nabla_p \mathbb{E}_\beta R(p; x, \beta) = \mathbb{E}_\beta \left( \nabla_p \frac{p}{1+e^{-x^T \beta}} \right).$$

For a fixed sample path ω, we write $$\nabla_p R(p; x, \beta(\omega)) = \frac{1}{1+e^{-x^T \theta - \sqrt{x^T \Sigma x} \cdot Z(\omega)}} + \quad \text{Equation 18}$$

$$\frac{pe^{-x^T \theta - \sqrt{x^T \Sigma x} \cdot Z(\omega)}}{\left(1+e^{-x^T \theta - \sqrt{x^T \Sigma x} \cdot Z(\omega)}\right)^2} \nabla_p (x^T \theta + \sqrt{x^T \Sigma x} \cdot Z(\omega)).$$

To make this expression more explicit, we need to specify the dependence of x on the price. Suppose that x can be partitioned as $$x=[x^f, p \cdot x^p]^T,$$

where $x^f$ is a vector of features whose values are fixed (known to the seller and not dependent on p), and $x^p$ is another fixed vector of features related to the price sensitivity. Thus, each component of x either depends linearly on p, or does not depend on p at all. In the simplest possible example, may be a dummy variable which equals 1 if the buyer is asking for a certain specific product. We may then have a different feature $x^p = x^f$ for some j, so that our model includes the base effect of the product on the win probability, as well as a specific price sensitivity for that product. We can then partition $$\theta = [\theta^f, \theta^p]^T, \Sigma = \begin{bmatrix} \Sigma^{ff} & \Sigma^{fp} \\ \Sigma^{pf} & \Sigma^{pp} \end{bmatrix}.$$

In this case:

$$\nabla_p (x^T \theta + \sqrt{x^T \Sigma x} \cdot Z(\omega)) = \quad \text{Equation 19}$$

$$(x^p)^T \theta^p + \frac{(x^p)^T \Sigma^{pf} x^f + p(x^p)^T \Sigma^{pp} x^p}{\sqrt{x^T \Sigma x}} Z(\omega).$$

The IPA gradient $$\hat{\nabla}_p R(p; x, \beta)$$

is obtained by generating $Z^\sim N(0, 1)$ and substituting this quantity for Z(ω) in equations 18 and 19. The optimal price is found by iterating $$p^{k+1} = p^k + \alpha_k \hat{\nabla}_p R(p^k; x, \beta), \quad \text{Equation 20}$$

This procedure converges to the Bayes-greedy price.

We can now summarize our entire framework for price optimization and statistical estimation. Suppose that we have already observed outcomes from n deals and constructed the belief parameters $(\theta^n, \Sigma^n)$. For the (n+1)st deal, we are given the features $x^{f,n}, x^{p,n}$. We then carry out the following steps:

1) Apply procedure in equation 20 to find the Bayes-greedy price;
2) Implement the price $p^n$ that is returned by this procedure (i.e., quote the price to the buyer);
3) Observe the response $Y^{n+1}$;
4) Apply procedure of equation 14 to find the optimal variance parameter $v^n$;
5) Calculate $(\theta^{n+1}, \Sigma^{n+1})$ from equations 10-11.

This process is repeated for n=0, 1, . . . , N.

VIII. Systems

Figure 2A:
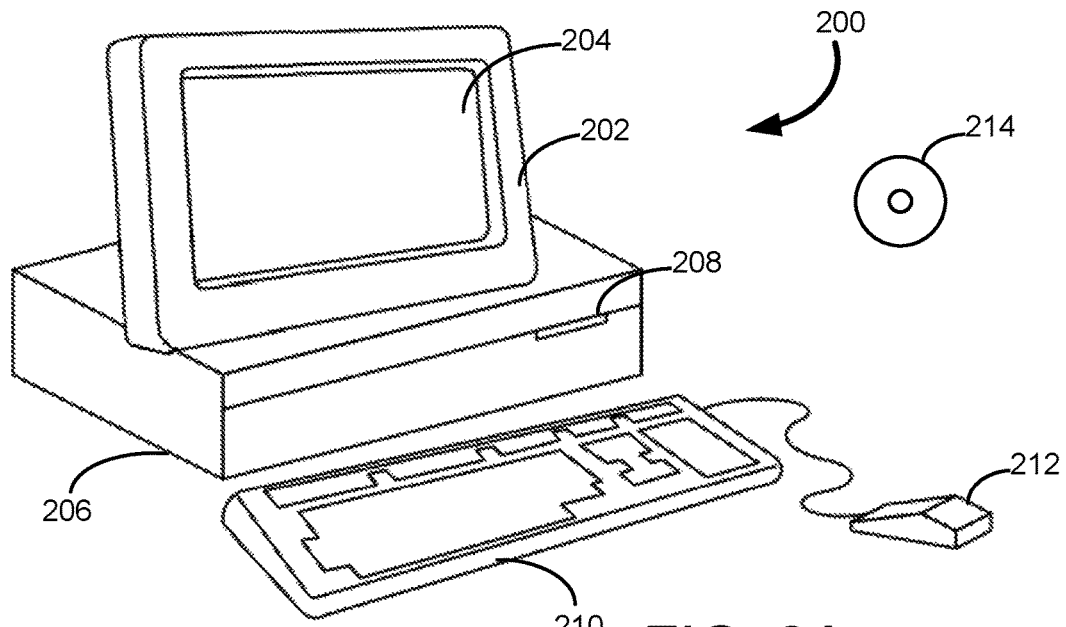
FIGS. 2A and 2B are example computer systems capable of implementing the system for improving bidding optimizations, in accordance with some embodiments.
Figure 2B:
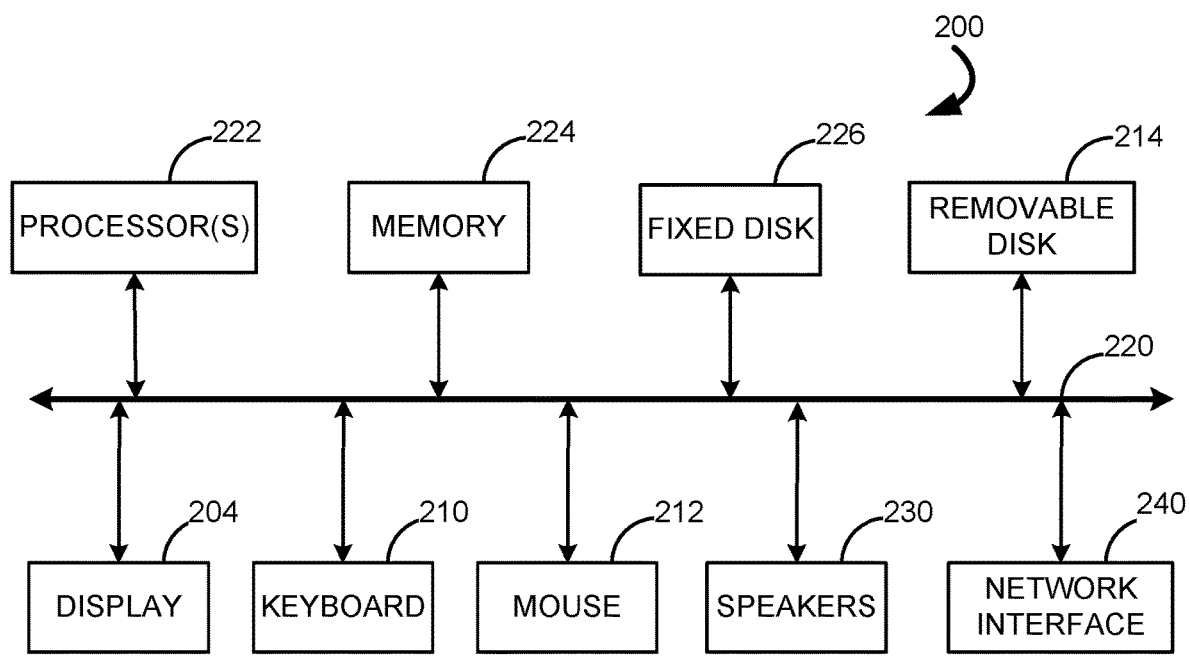

Lastly, FIGS. 2A and 2B illustrate a Computer System 200, which is suitable for implementing embodiments of the present invention. FIG. 2A shows one possible physical form of the Computer System 200. Of course, the Computer System 200 may have many physical forms ranging from a printed circuit board, an integrated circuit, and a small handheld device up to a huge super computer. Computer system 200 may include a Monitor 202, a Display 204, a Housing 206, a Disk Drive 208, a Keyboard 210, and a Mouse 212. Disk 214 is a computer-readable medium used to transfer data to and from Computer System 200.

FIG. 2B is an example of a block diagram for Computer System 200. Attached to System Bus 220 are a wide variety of subsystems. Processor(s) 222 (also referred to as central processing units, or CPUs) are coupled to storage devices, including Memory 224. Memory 224 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A Fixed Disk 226 may also be coupled hi-directionally to the Processor 222; it provides additional data storage capacity and may also include any of the computer-readable media described below. Fixed Disk 226 may be used to store programs, data, and the like and is typically a secondary storage medium (such as a hard disk) that is slower than primary storage. It will be appreciated that the information retained within Fixed Disk 226 may, in appropriate cases, be incorporated in standard fashion as virtual memory in Memory 224. Removable Disk 214 may take the form of any of the computer-readable media described below.

Processor 222 is also coupled to a variety of input/output devices, such as Display 204, Keyboard 210, Mouse 212 and Speakers 230. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 222 optionally may be coupled to another computer or telecommunications network using Network. Interface 240. With such a Network Interface 240, it is contemplated that the Processor 222 might receive information from the network, or might output information to the network in the course of performing the above-described B2B bidding optimization. Furthermore, method embodiments of the present invention may execute solely upon Processor 222 or may execute over a network such as the Internet in conjunction with a remote CPU that shares a portion of the processing.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

The invention claimed is:

1. A method for reducing computations of non-normal data with a processor, comprising:
    receiving, at a processor, features of n events;
    receiving, at the processor, observed outcomes of the n events;
    calculating, via the processor, a normal distribution of the observed outcomes based on the features; and
    when a new event occurs:
        calculating a posterior distribution representing regression coefficients of the observed outcomes with the new event, the posterior distribution being a non-normal distribution;
        replacing, within memory associated with the processor, the posterior distribution with a normal approximated distribution of the posterior distribution;
        calculating a projected outcome of the new event using the normal approximated distribution with the formula: $p^{k-1}=p^k-\alpha_k \nabla_{p^k} R(p^k; x, \beta)$; and
    outputting the projected outcome to a display.

2. The method of claim 1, further comprising:
    adding the projected outcome to the observed outcomes, resulting in updated projected outcomes; and
    recursively updating the normal distribution of the observed outcomes based on the updated projected outcomes.

3. The method of claim 1, further comprising:
    calculating, based at least in part on the projected outcome, an optimal variance parameter.

4. The method of claim 3, wherein the optimal variance parameter is calculated using the equation: $v^{k+1}=v^k-\alpha_k \hat{\nabla}_{v^k} \mathcal{D}^{KL}(Q\|P)$.

5. The method of claim 1, wherein then events comprise previous transactions, and the new event is a new transaction.

6. The method of claim 1, wherein the formula for calculating the projected outcome is the Bayes-greedy formula.

7. The method of claim 1, wherein the normal approximated distribution is generated by optimizing a divergence between the posterior distribution and an initial approximation of the posterior distribution, wherein the optimizing uses gradient based stochastic approximation.

8. A system comprising:
    a processor; and
    a non-transitory computer-readable storage medium having instructions stored which, when executed by the processor, cause the processor to perform operations comprising:
    receiving features of n events;
    receiving observed outcomes of the n events;
    calculating a normal distribution of the observed outcomes based on the features; and
    when a new event occurs:
        calculating a posterior distribution representing regression coefficients of the observed outcomes with the new event, the posterior distribution being a non-normal distribution;
        replacing, within the non-transitory computer-readable storage medium, the posterior distribution with a normal approximated distribution of the posterior distribution;

calculating a projected outcome of the new event using the normal approximated distribution with the formula: $p^{k-1}=p^k-\alpha_k \nabla_{p^k} R(p^k; x, \beta)$; and outputting the projected outcome to a display.

9. The system of claim 8, the non-transitory computer-readable storage medium having additional instructions stored which, when executed by the processor, cause the processor to perform operations comprising:

adding the projected outcome to the observed outcomes, resulting in updated projected outcomes; and recursively updating the normal distribution of the observed outcomes based on the updated projected outcomes.

10. The system of claim 8, the non-transitory computer-readable storage medium having additional instructions stored which, when executed by the processor, cause the processor to perform operations comprising:

calculating, based at least in part on the projected outcome, an optimal variance parameter.

11. The system of claim 10, wherein the optimal variance parameter is calculated using the equation: $v^{k+1}=v^k-\alpha_k \hat{\nabla}_{v^k} \mathcal{D}^{KL}(Q\|P)$.

12. The system of claim 8, wherein the n events comprise previous transactions, and the new event is a new transaction.

13. The system of claim 8, wherein the formula for calculating the projected outcome is the Bayes-greedy formula.

14. The system of claim 8, wherein the normal approximated distribution is generated by optimizing a divergence between the posterior distribution and an initial approximation of the posterior distribution, wherein the optimizing uses gradient based stochastic approximation.

15. A non-transitory computer-readable storage medium having instructions stored which, when executed by a processor, cause the processor to perform operations comprising:

receiving features of n events;

receiving observed outcomes of the n events;

calculating a normal distribution of the observed outcomes based on the features; and when a new event occurs:

calculating a posterior distribution representing regression coefficients of the observed outcomes with the new event, the posterior distribution being a non-normal distribution;

replacing, within the non-transitory computer-readable storage medium, the posterior distribution with a normal approximated distribution of the posterior distribution;

calculating a projected outcome of the new event using the normal approximated distribution with the formula: $p^{k-1}=p^k-\alpha_k \nabla_{p^k} R(p^k; x, \beta)$; and outputting the projected outcome to a display.

16. The non-transitory computer-readable storage medium of claim 15, having additional instructions stored which, when executed by the processor, cause the processor to perform operations comprising:

adding the projected outcome to the observed outcomes, resulting in updated projected outcomes; and recursively updating the normal distribution of the observed outcomes based on the updated projected outcomes.

17. The non-transitory computer-readable storage medium of claim 15, having additional instructions stored which, when executed by the processor, cause the processor to perform operations comprising:

calculating, based at least in part on the projected outcome, an optimal variance parameter.

18. The non-transitory computer-readable storage medium of claim 17, wherein the optimal variance parameter is calculated using the equation: $v^{k+1}=v^k-\alpha_k \hat{\nabla}_{v^k} \mathcal{D}^{KL}(Q\|P)$.

19. The non-transitory computer-readable storage medium of claim 15, wherein then events comprise previous transactions, and the new event is a new transaction.

20. The non-transitory computer-readable storage medium of claim 15, wherein the formula for calculating the projected outcome is the Bayes-greedy formula.

* * * * *